United States Patent
Allen

[11] 3,920,459
[45] Nov. 18, 1975

[54] FLAMEPROOF COMPOSITIONS
[75] Inventor: Barrington T. Allen, Portland, Oreg.
[73] Assignee: Crown Zellerbach Corporation, San Francisco, Calif.
[22] Filed: Sept. 9, 1974
[21] Appl. No.: 504,631

[52] U.S. Cl. ...... 106/15 FP; 162/159; 260/45.75 B; 260/45.7 P; 260/45.9 NP; 260/28.5
[51] Int. Cl.² .......................................... C08G 6/00
[58] Field of Search ................ 162/159; 106/15 FP; 260/45.75 B, 45.7 P, 45.9 NP, 28.5

[56] References Cited
UNITED STATES PATENTS

| | | | |
|---|---|---|---|
| 3,305,431 | 2/1967 | Peterson | 260/45.75 |
| 3,333,970 | 8/1967 | Green | 260/45.75 |
| 3,770,577 | 11/1973 | Humphrey | 260/45.75 |
| 3,787,256 | 1/1974 | Nowotny | 162/157 |

OTHER PUBLICATIONS

Chemistry and Uses of Fire Retardants – John W. Lyons (1970) pp. 143 to 149.

*Primary Examiner*—V. P. Hoke
*Attorney, Agent, or Firm*—Corwin R. Horton; Stanley M. Teigland

[57] ABSTRACT

Paper made from a blend of synthetic polymer fibers and cellulosic fibers can be made flameproof by incorporating into the polymer a conventional flame retardant system consisting of organically-bonded chlorine or bromine and a synergist, such as antimony oxide, and, in addition, by applying to the paper a sizing containing the same or a different synergist.

10 Claims, No Drawings

FLAMEPROOF COMPOSITIONS

BACKGROUND OF THE INVENTION

Polymer fibers suitable for making paper and similar products have been developed in recent years. Having a morphology and size similar to natural cellulosic fibers, the polymer fibers can be made into paper on conventional papermaking equipment, and can also be mixed with cellulosic fibers to make paper products consisting of a uniform blend of both types of fibers. Such fibers and their conversion to paper products are known.

For certain applications, it is desirable to impart flame retardancy to paper products. By incorporating conventional flame retardants into the polymer fibers, it is possible to prepare a flameproof paper product consisting solely of polymer fibers. However, when the paper product also contains cellulosic fibers, the flame retardants in the polymer fibers do not satisfactorily prevent the cellulosic fibers from burning.

SUMMARY OF THE INVENTION

This invention provides flameproof compositions made from a blend of synthetic, organic polymer fibers and natural cellulosic fibers or other inherently flammable fibers or materials. The polymer fibers contain organically-bonded chlorine or bromine atoms and an additive which acts synergistically with the chlorine or bromine atoms in providing flame retardancy. In addition, the composition has a sizing which contains a flame retardant additive which also acts synergistically with the halogen atoms. The additive in the sizing may be the same as or different from the additive in the polymer.

Chlorine and bromine atoms impart flame retardancy to synthetic polymers. As long as the halogen atoms are organically bonded (i.e., bonded to a carbon atom), the structure of the molecules to which the halogen atoms are bonded is not important. For example, the halogen atoms may be bonded directly to the polymer itself, as in the case of polymers made from chlorinated monomers or polymers chlorinated after polymerization. U.S. Pat. No. 3,787,256, for example, discloses a method of introducing chlorine atoms directly into papermaking polyolefin fibers. The halogen atoms may also be bonded to organic compounds physically blended with the polymer. A large number of such compounds are employed in the art to impart flame retardancy to polymers. They include chlorinated paraffins, brominated aromatics, perchlorinated polycyclics, bromochlorocycloparaffins, brominated polyols, and the like. Chlorinated paraffins are especially suitable because of their lower cost. As available commercially, such paraffins normally have a chlorine content of from about 40% to 70% by weight and a molecular weight of from about 300 to 1500. The paraffins may be either liquid or solid.

Compounds which act synergistically with halogen atoms in providing flame retardancy (referred to as synergists) include antimony oxide, salts of boric acid (such as zinc borate and barium borate), and salts and esters of phosphoric acid (such as ammonium phosphate, triphenyl phosphate, cresyldiphenyl phosphate, tricresyl phosphate, triisopropylphenyl phosphate, and tris(2-ethylhexyl) phosphate). Such compounds also include halogenated esters of phosphoric acid, which contain both the halogen and phosphate groups in the same molecule. Typical examples are tris(2-chloroethyl) phosphate, tris(1,3-dichloropropyl) phosphate, and tris(2,3-dibromopropyl) phosphate.

The total amount of halogen atoms and synergist in the polymer fibers is preferably from about 10% to 75%, more preferably about 20% to 60%, by weight based on the weight of the polymer. The weight ratio of halogen atoms to synergist in the polymer is preferably from about 1:1 to about 7:1, more preferably from about 2:1 to 4:1. For purposes of determining the weight ratio when the synergist is a phosphate, the weight of the phosphate group only is considered as the weight of the synergist.

The synergist and a halogen-containing organic compound may be incorporated into the polymer fibers by simply mixing the two compounds with the polymer at any time prior to the formation of the fibers. To facilitate such mixing, the compounds are preferably oleophilic. Halogen-containing organic compounds are normally quite oleophilic. Antimony oxide and esters of phosphoric acid are less oleophilic, but have a sufficient degree of affinity for organic polymers that they can be suitably blended therewith and retained therein during the fiber-forming process, and therefore are preferred as the synergist in the polymer fiber.

In order to render the composition of the invention self-extinguishing, the weight ratio of the polymer fibers to the cellulosic or other fibers is preferably at least about 1:9, more preferably about 1:4. As the ratio approaches 1:1, it is possible to make a nonsized self-extinguishing paper by incorporating as much of the flame retardant system into the polymer as it can hold. However, by applying a sizing of only a few percent synergist in accordance with this invention, it is possible to obtain the same degree of flame retardancy using substantially less flame retardant in the polymer. As the ratio becomes about 4:1, the advantage obtained by applying the sizing begins to be outweighed by the burden of applying it.

In accordance with this invention, when a sizing containing a synergist is applied to a sheet made from a blend of cellulosic or other inherently flammable fibers and synthetic polymer fibers containing organically-bonded chlorine or bromine atoms and a synergist, a significantly lower level of halogen atoms and synergist are required in the polymer to impart the same degree of flame retardancy. Hence, there is a second synergistic effect present in this invention. In addition to the known chemical synergy between the halogen atoms and the synergist, there is another synergy based on the physical allocation of the flame retardant system in the polymer fibers and the surface of the composition. The same degree of synergy is not observed when the second synergist is present in the body of the composition (as, for example, when it is incorporated into the furnish) rather than on the surface as a sizing.

The sizing may be applied to a paper product in accordance with any convenient sizing or coating method, such as by means of a size press or by passing the paper through a suspension or solution of the synergist, followed by drying of the paper. Other suitable techniques, such as spraying, may be used for other compositions. After being dried, the composition may be heated to a temperature above the melting point of the fibers with no adverse effect on the flame retardant properties.

The amount of synergist deposited on the surface of the composition is from about 0.1% to 20%, preferably 0.5% to 15%, by weight based on the weight of the composition. Generally, the proportion of the synergist required to render the composition self-extinguishing is less for higher basis weight compositions. For example, for paper having a basis weight of 60 grams/square meter, the amount of synergist deposited is preferably from about 4% to 15% by weight based on the weight of the paper; and for paper having a basis weight of 800 grams/square meter, the amount of synergist deposited is preferably from about 1% to 5% by weight.

The synergist in the sizing is preferably colloidal antimony oxide or ammonium phosphate. Ammonium phosphate is generally as effective as antimony oxide and is less expensive, but, unlike colloidal antimony oxide, it is not leach-proof.

In addition to the synergist, the sizing bath may contain other conventional sizing agents or adjuvants. For example, when the synergist is antimony oxide pigment, it is desirable to employ a dispersing agent. It is also desirable to employ a binding agent when a non-leach-proof synergist is used.

The concentration of the synergist in the sizing bath is preferably from about 1% to 10% by weight, depending on the amount of synergist desired to be deposited on the composition (referred to as pickup). For example, a concentration of 10% will provide a pickup of about 15% on paper having a basis weight of 60 grams/square meter and a pickup of about 5% on paper having a basis weight of 800 grams/square meter. The pickup is generally proportional to the concentration. For example, a concentration of 5% will provide a pickup of about 7.5% on paper having a basis weight of 60, and a pickup of about 2.5% on paper having a basis weight of 800.

The polymer from which the synthetic fibers are prepared is preferably a polyolefin, more preferably polyethylene or polypropylene.

This invention is especially applicable to paper having a basis weight from about 60 to 2000 grams/square meter. Such products are useful as building materials, e.g., wallpaper and paneling. However, the invention is also applicable to other materials in the form of sheets prepared from synthetic, organic polymer fibers and other inherently flammable fibers or other materials.

The compositions of this invention are flameproof. As used herein, the term "flameproof" means that the composition is self-extinguishing when subjected to the test known as National Fire Protection Association 702, Chapter 4, with the proviso that when the basis weight of the composition is greater than 600 grams/square meter the test procedure is modified by having the sample in a vertical position and the flame held for a period of 10 seconds. In the test, a two-inch by six-inch sample strip is secured on three sides between matched metal plates. The plates are slotted and cover all but the central 1.5 inches of the width of the sample, which is held at a 45° angle. The sample is contacted with a flame held at the lower exposed edge for one second and is self-extinguishing if it fails to ignite or if unburned material remains across the complete width of the top of the exposed sample.

In the following examples, the polymer fibers were prepared in accordance with the method described in West German OLS No. 2,249,604 or OLS No. 2,343,543. In each example in which the basis weight of the paper exceeded 600 grams/square meter, the test procedure was modified by having the sample in a vertical position and by holding the flame for a period of 10 seconds. Also, in each example a comparative sample, which was identical to the paper of the example except it was not sized, was prepared and tested, with the result that the comparative sample was not self-extinguishing.

EXAMPLE 1

Paper having a basis weight of 60 grams/square meter was prepared from a blend of equal parts by weight of natural cellulosic fibers and polyethylene fibers. Antimony oxide and a chlorinated paraffin having a molecular weight of about 1000 and a chlorine content of 70% were incorporated in an amount of 55% by weight into the polyethylene fiber by being blended with the polyethylene prior to the formation of the fibers. The weight ratio of chlorinated paraffin to antimony oxide was 5:1. The paper was sized with 4% by weight, based on the weight of the paper, of antimony oxide by dipping the paper into an aqueous suspension of 5% by weight colloidal antimony oxide. After the paper had dried, its flame retardancy was determined in accordance with NFPA 702, Chapter 4. The paper was self-extinguishing.

EXAMPLE 2

Example 1 was repeated except tris(2,3-dibromopropyl) phosphate (70% bromine, 4.5% phosphorous by weight) was incorporated in an amount of 30% by weight into the polymer in place of the chlorinated paraffin and the antimony oxide, and the paper was sized with 15% by weight of antimony oxide. The paper was self-extinguishing.

EXAMPLE 3

Example 1 was repeated except the paper had a basis weight of 800 grams/square meter, the weight ratio of polyethylene fibers to cellulosic fibers was 1:3, and the paper was sized with 1% by weight of antimony oxide using an aqueous suspension of 10% by weight colloidal antimony oxide. The paper was self-extinguishing. Other samples of the same paper were subjected to 20,000 and 40,000 psi pressure at 140° C. for 30 seconds to fuse the synthetic fibers. The flame retardant properties of the fused samples were at least as good as the unfused sample.

EXAMPLE 4

Paper having a basis weight of 800 grams/square meter was prepared from a blend of polyethylene fibers and cellulose fibers in a weight ratio of 1:4. Tris(2,3-dibromopropyl) phosphate was incorporated in an amount of 30% by weight into the polymer and the paper was sized with 3% by weight of antimony oxide using an aqueous suspension of 10% by weight colloidal antimony oxide. The paper was self-extinguishing.

EXAMPLE 5

Example 4 was repeated except the paper was sized with 3.5% by weight ammonium phosphate using an aqueous solution having a concentration of 10% by weight. The paper was self-extinguishing.

What is claimed is:

1. A flameproof composition of synthetic, organic polymer fibers and inherently flammable material in a weight ratio of from about 1:9 to about 4:1, the polymer fibers containing from about 10% to 75% by weight of a flame retardant system comprising organically-bonded chlorine or bromine atoms and a first additive which acts synergistically with the chlorine or bromine atoms in providing flame retardancy, the weight ratio of the halogen atoms to the synergistically-acting compound being from about 1:1 to about 7:1, and the composition having deposited on the surface thereof a second additive which acts synergistically with the chlorine or bromine atoms in providing flame retardancy, the second additive being present in an amount of from about 0.1% to 20% by weight based on the weight of the composition.

2. The composition of claim 1 in which the polymer is a polyolefin.

3. The composition of claim 1 in which the second additive is selected from the group consisting of antimony oxide and ammonium phosphate.

4. The composition of claim 1 in which the first additive is selected from the group consisting of antimony oxide and esters of phosphoric acid.

5. The composition of claim 1 in which the halogen atoms are bound to an organic compound physically blended with the polymer.

6. The composition of claim 5 in which the organic compound is a chlorinated paraffin or a halogenated ester of phosphoric acid.

7. The composition of claim 1 in which the inherently flammable material is cellulose fibers.

8. The composition of claim 7 in which the weight ratio of polymer fibers to cellulose fibers is from about 1:4 to 1:1.

9. The composition of claim 1 in which the polymer is polyethylene.

10. The composition of claim 1 wherein the composition is paper having a basis weight of from about 60 to 2000 grams/square meter.

* * * * *